(12) United States Patent
Lambert

(10) Patent No.: US 8,010,800 B2
(45) Date of Patent: Aug. 30, 2011

(54) SEARCH ENGINE AND DIGITAL RIGHTS MANAGEMENT

(75) Inventor: Martin R Lambert, Chalford (GB)

(73) Assignee: SealedMedia Limited, Bukinghamshire (GB)

( * ) Notice: Subject to any disclaimer, the term of this patent is extended or adjusted under 35 U.S.C. 154(b) by 1129 days.

(21) Appl. No.: 10/480,041

(22) PCT Filed: Jun. 26, 2001

(86) PCT No.: PCT/GB01/02826
§ 371 (c)(1),
(2), (4) Date: Dec. 9, 2003

(87) PCT Pub. No.: WO03/003248
PCT Pub. Date: Jan. 9, 2003

(65) Prior Publication Data
US 2004/0158527 A1      Aug. 12, 2004

(51) Int. Cl.
*H04L 9/32* (2006.01)
(52) U.S. Cl. .......................... 713/189; 713/193; 726/26
(58) Field of Classification Search .................. 726/1–7, 726/14, 26–27, 18–19, 30; 380/200–201, 380/28–29, 228–232, 239, 255, 37; 705/50–51, 705/57, 58; 713/187, 189, 193, 153–154, 713/164–167, 170–171; 711/100, 105, 111–112, 711/145, 150–152, 163–164, 205–207; 707/100–101
See application file for complete search history.

(56) References Cited

U.S. PATENT DOCUMENTS

| | | | | |
|---|---|---|---|---|
| 6,026,409 A * | 2/2000 | Blumenthal | ................ | 707/104.1 |
| 6,070,849 A * | 6/2000 | Larmande et al. | ............ | 248/610 |
| 6,154,156 A * | 11/2000 | Tagato | ............................ | 341/79 |
| 6,327,594 B1 * | 12/2001 | Van Huben et al. | .......... | 707/200 |
| 6,457,017 B2 * | 9/2002 | Watkins et al. | ............ | 707/103 R |
| 6,535,871 B1 * | 3/2003 | Romansky et al. | ................ | 707/2 |
| 6,654,754 B1 * | 11/2003 | Knauft et al. | ................. | 707/100 |
| 6,854,061 B2 * | 2/2005 | Cooper et al. | ................ | 713/190 |

(Continued)

FOREIGN PATENT DOCUMENTS

EP        1 130 490 A2      9/2001

(Continued)

OTHER PUBLICATIONS

Great Britain Search Report, Sep. 4, 2002, 1 page.

(Continued)

*Primary Examiner* — Hosuk Song
*Assistant Examiner* — Leynna T Truvan
(74) *Attorney, Agent, or Firm* — Kilpatrick Townsend & Stockton LLP

(57) ABSTRACT

DRM-encrypted content is opened up to "trusted search", without compromising copyright control, thus allowing end users to locate DRM-encrypted content alongside upon unencrypted content. The indexer (or crawler) (216) of a search engine (214) is provided with a DRM module (302) for communication with a DRM server (306) so that the indexer (216) can access even the encrypted content nominally as if it were a human end user of the content. The indexer (216) may be issued with a DRM-recognized "identity" so as to distinguish itself from other end users and DRM-enabled search engines. Thus, the search engine (214) can programmatically access the content, subject to being able to obtain permission from the DRM solution.

22 Claims, 6 Drawing Sheets

U.S. PATENT DOCUMENTS

| | | | |
|---|---|---|---|
| 6,948,070 B1 * | 9/2005 | Ginter et al. | 713/193 |
| 6,950,941 B1 * | 9/2005 | Lee et al. | 713/193 |
| 7,003,118 B1 * | 2/2006 | Yang et al. | 380/287 |
| 7,027,599 B1 * | 4/2006 | Entwistle | 380/202 |
| 7,035,335 B1 * | 4/2006 | Iacobelli et al. | 375/240.25 |
| 7,043,473 B1 * | 5/2006 | Rassool et al. | 1/1 |
| 7,062,707 B1 * | 6/2006 | Knauft et al. | 715/201 |
| 7,085,741 B2 * | 8/2006 | Lao et al. | 705/51 |
| 7,139,747 B1 * | 11/2006 | Najork | 1/1 |
| 7,158,953 B1 * | 1/2007 | DeMello et al. | 705/51 |
| 7,171,558 B1 * | 1/2007 | Mourad et al. | 713/168 |
| 7,181,438 B1 * | 2/2007 | Szabo | 707/2 |
| 7,185,092 B2 * | 2/2007 | Furui et al. | 709/225 |
| 7,233,948 B1 * | 6/2007 | Shamoon et al. | 707/9 |
| 7,266,821 B2 * | 9/2007 | Polizzi et al. | 718/100 |
| 7,308,717 B2 * | 12/2007 | Koved et al. | 726/27 |
| 7,310,670 B1 * | 12/2007 | Walbeck et al. | 709/225 |
| 7,353,209 B1 * | 4/2008 | Peinado et al. | 705/59 |
| 7,395,549 B1 * | 7/2008 | Perlman et al. | 726/10 |
| 7,426,750 B2 * | 9/2008 | Cooper et al. | 726/26 |
| 7,461,249 B1 * | 12/2008 | Pearson et al. | 713/156 |

FOREIGN PATENT DOCUMENTS

| | | |
|---|---|---|
| GB | 2 228 807 A | 9/1990 |
| GB | 2 367 668 A | 4/2002 |
| WO | 00/34845 A | 6/2000 |
| WO | 00/59151 A | 10/2000 |
| WO | WO 01/90934 A1 | 11/2001 |

OTHER PUBLICATIONS

Great Britain Search Report, Jan. 30, 2002, 1 page.

* cited by examiner

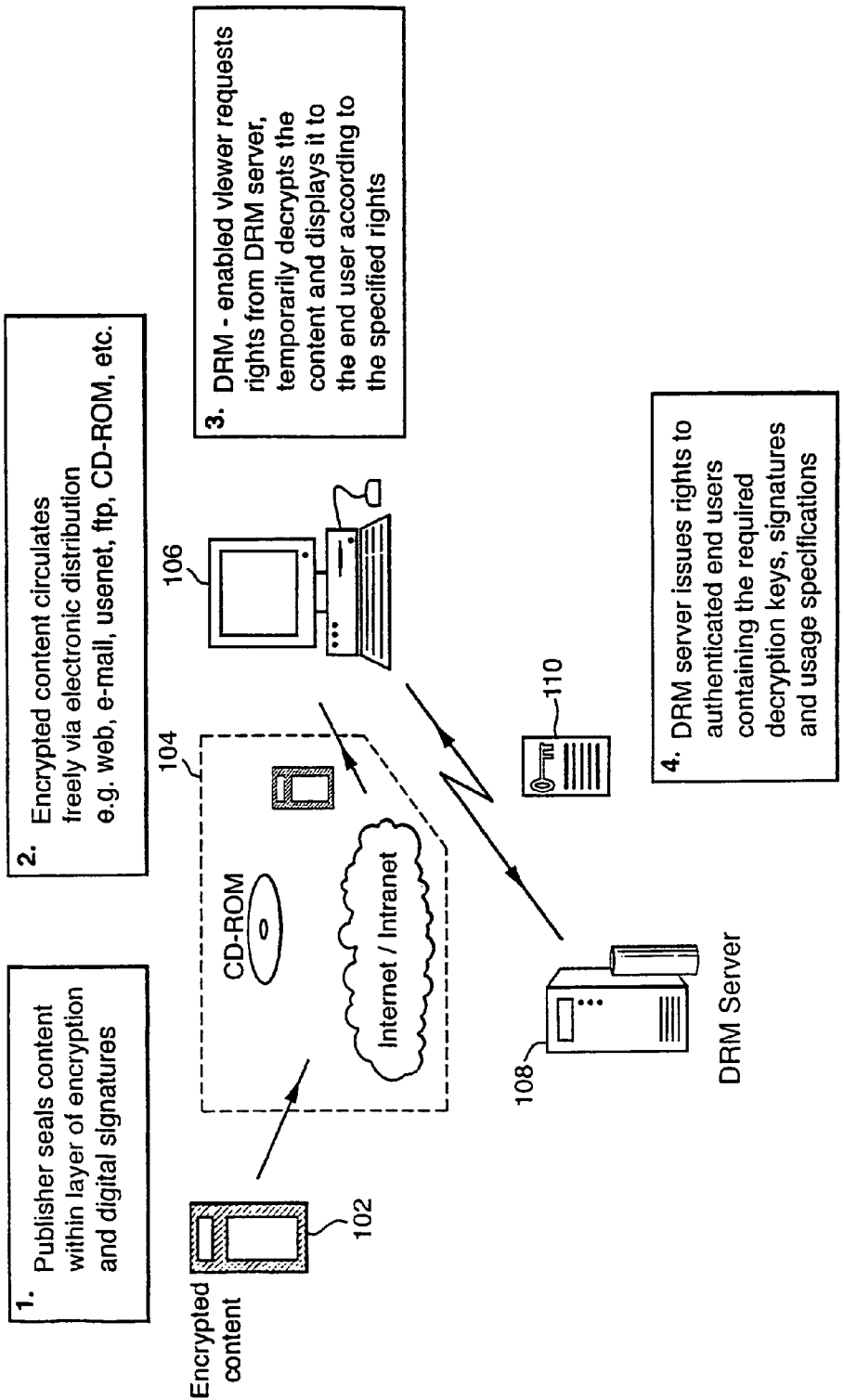

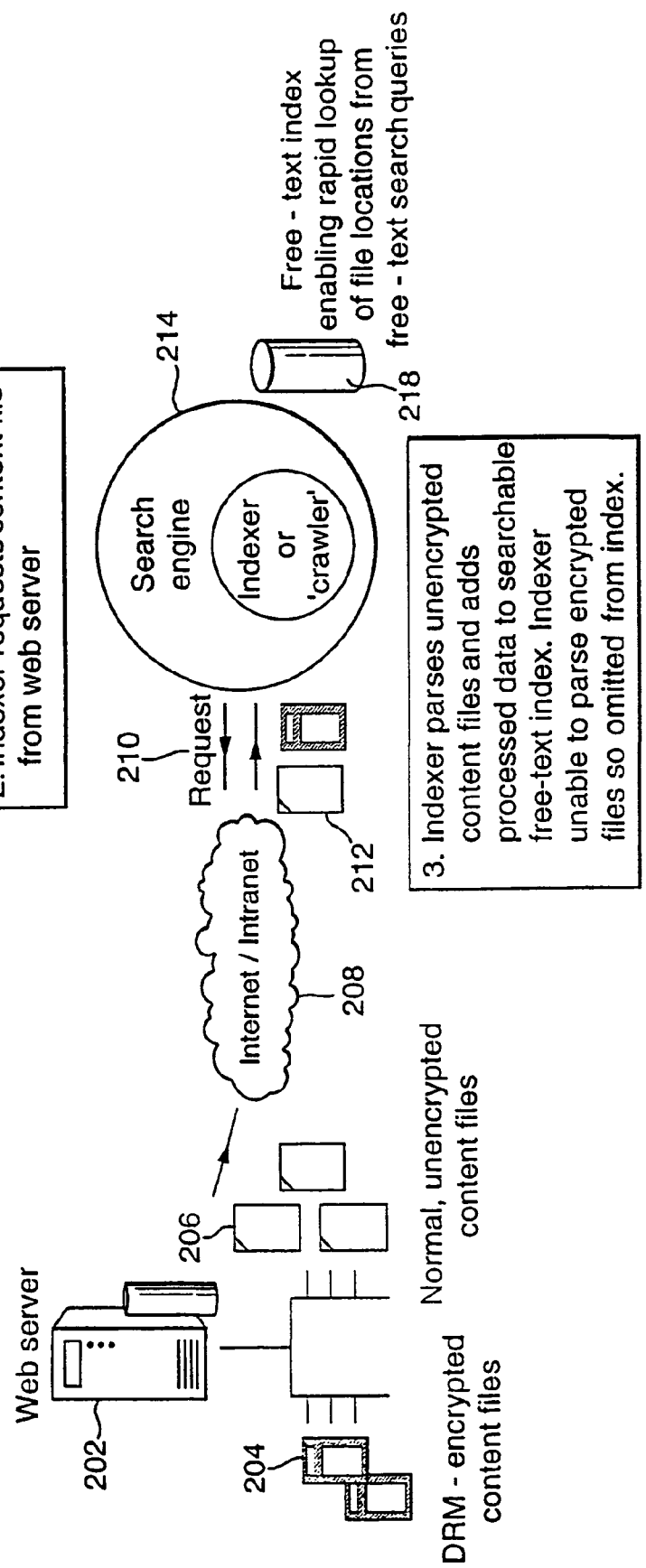

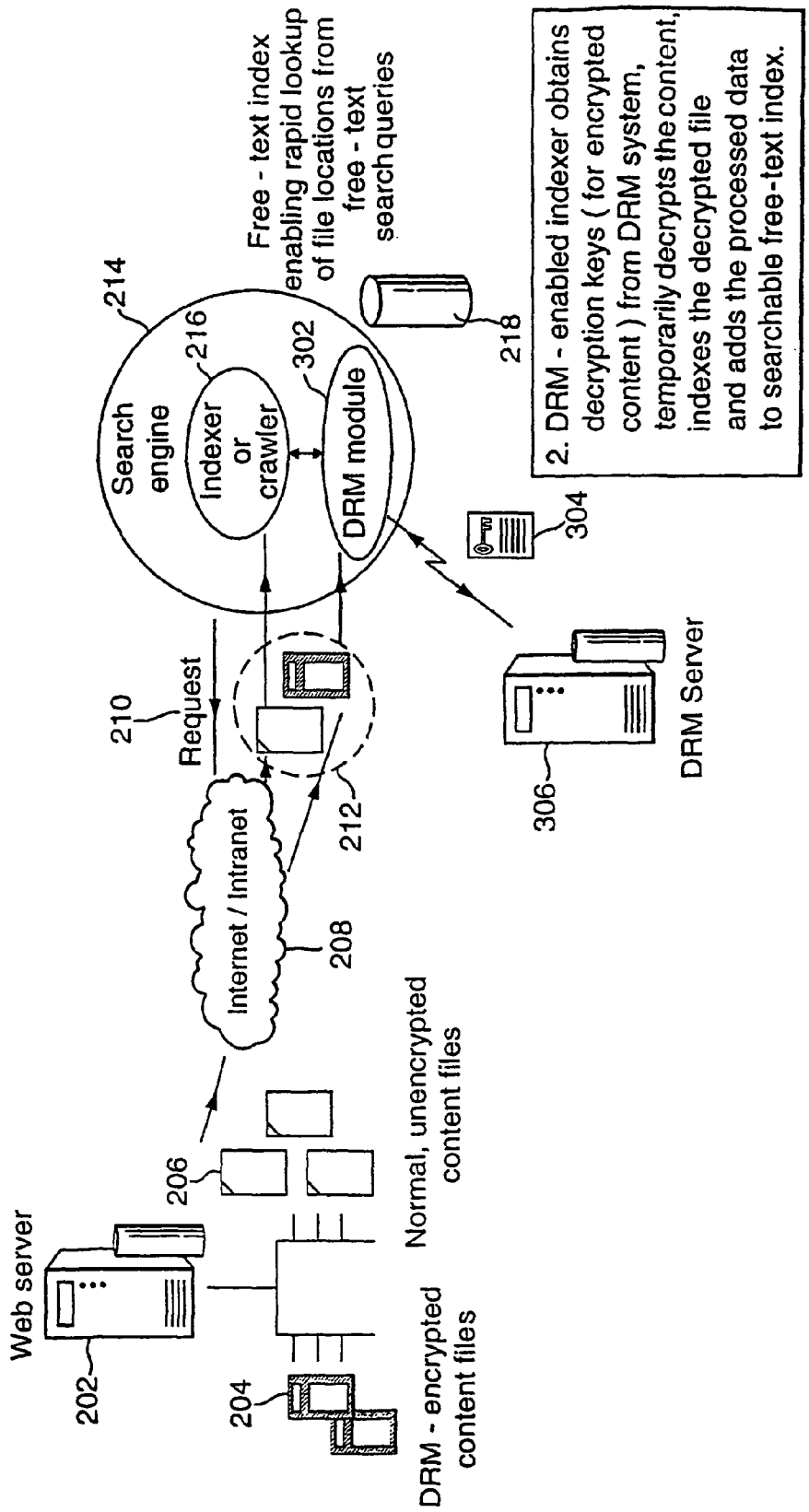

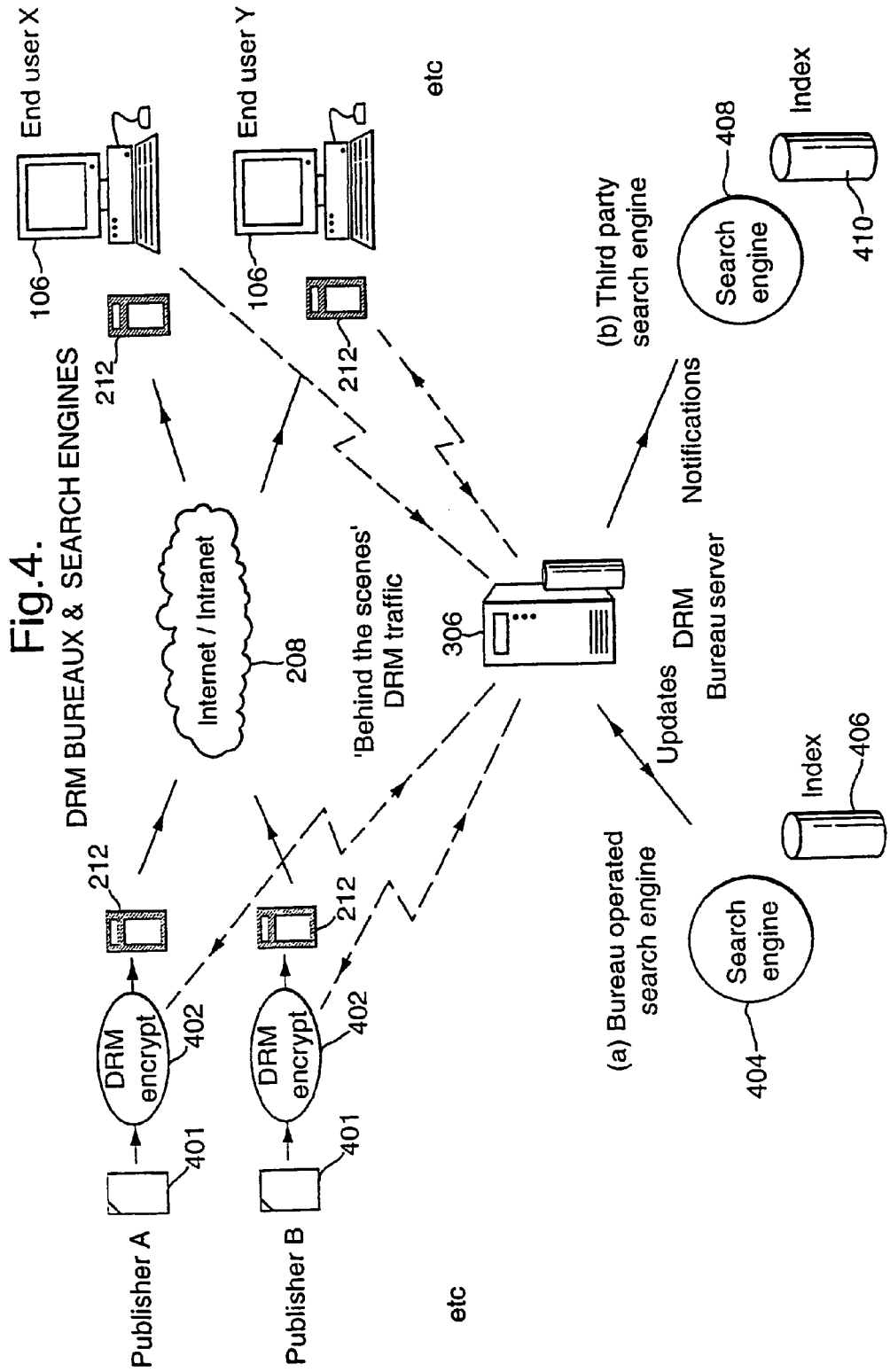

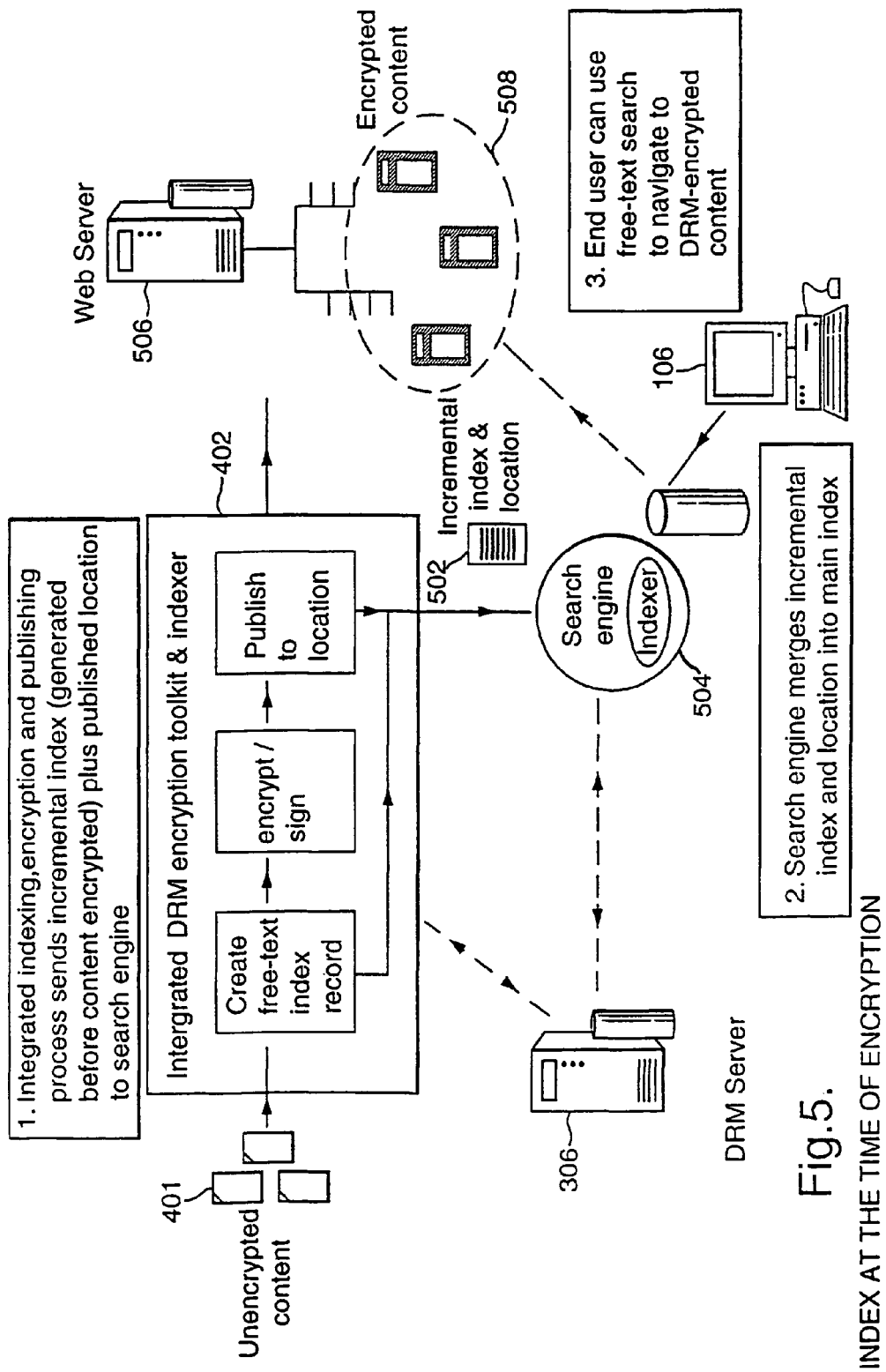
Fig.5. INDEX AT THE TIME OF ENCRYPTION

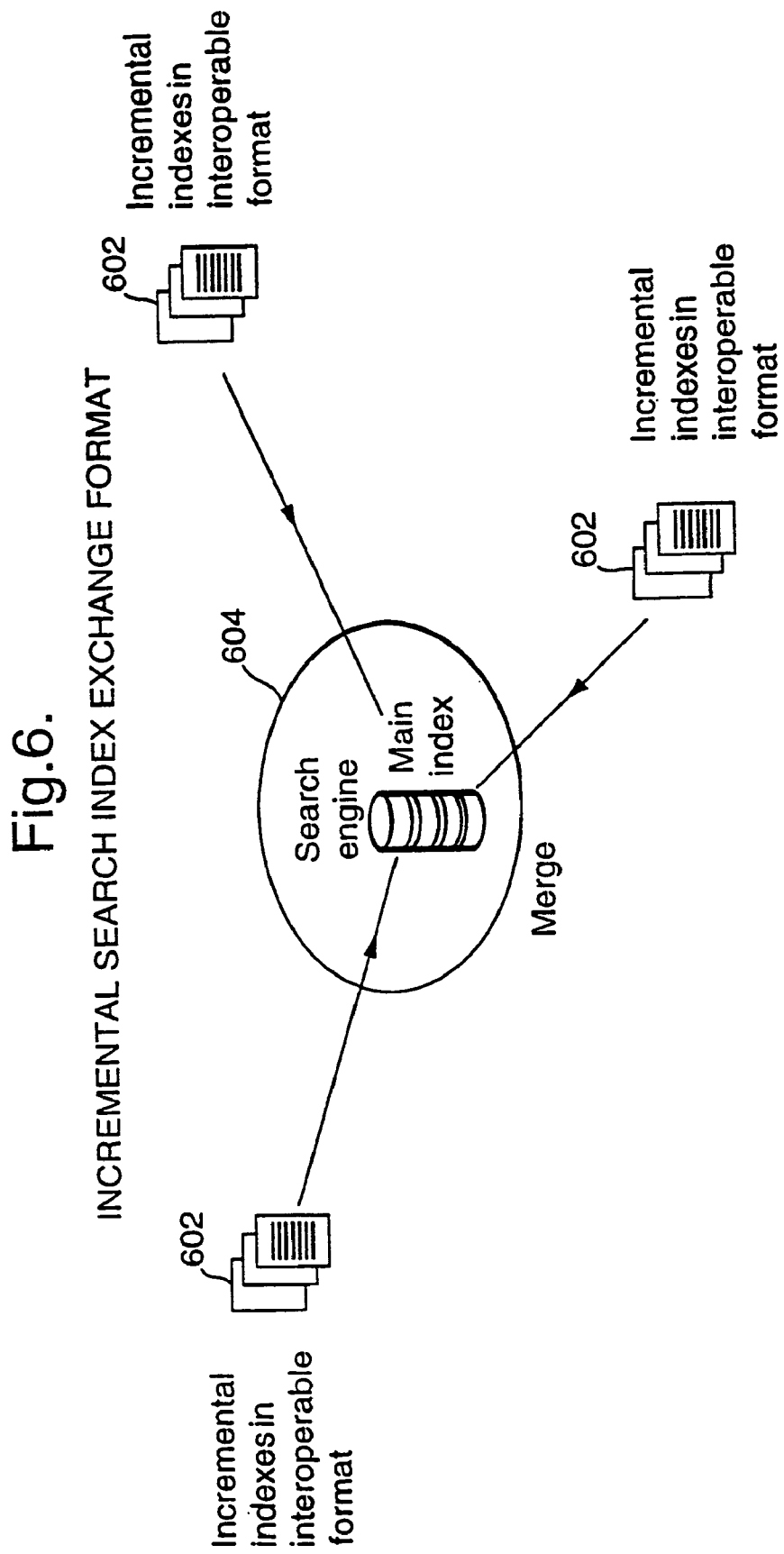

SEARCH ENGINE AND DIGITAL RIGHTS MANAGEMENT

This application is the US national phase of international application PCT/GB01/02826, filed in English on 26 Jun. 2001, which designated the US. The entire contents of this application is incorporated herein by reference.

The present invention is in the field of search engines and digital rights management. The present invention has particular applicability to searching for content in a DRM environment where the content is encrypted.

If there is to be a viable commerce based upon the electronic distribution of valuable multimedia content (such as for example reports, images, music tracks, videos, etc.), then there must be some means of enforcing and retaining copyright control over the electronic content. There is now emerging a set of hardware and software solutions, generically known as digital rights management (DRM) solutions, that aim to provide this copyright control while, to a varying degree, also enabling new commercial models suited to the Internet and electronic delivery. Common to virtually all these solutions is the requirement that the multimedia content files be distributed within a persistent tamperproof encryption wrapper (the idea being that a million copies of encrypted content is no more valuable than one). Very simply, DRM works by carefully providing the consumers of this encrypted content with secret decryption keys that provide temporary access to the content for some controlled purpose, e.g. viewing, printing, playing, etc. without ever providing access to the raw decrypted content that could be used for unauthorised reuse or redistribution.

FIG. 1 illustrates schematically an overview of how typical DRM systems work. Referring to FIG. 1, a "publisher" of digital content seals their digital content files, buffers or streams within a layer of encryption and digital signatures into a DRM-encrypted content format 102. The encryption makes it difficult for malicious consumers to obtain access to the raw decrypted content (and make unauthorised copies for redistribution). The digital signatures prevent malicious consumers from tampering with the encrypted content (perhaps to pass off the content as their own) by enabling the DRM system to detect the smallest change to the encrypted content. The DRM-encrypted content 102 can then be delivered to consumers via any electronic distribution medium 104, e.g. web, ftp, email, CD-ROM, etc. The publisher need not worry about protecting the DRM-encrypted content 102 in transit to the consumer since it is inherently protected by its encryption layer and digital signatures.

Less sophisticated DRM systems sometimes bundle individual consumer access rights with the content, either within the encryption layer or at least protected by the digital signatures. The advantage of bundling rights with the content is that the consumer can obtain both the content and the rights at the same time. Disadvantages include extreme inflexibility in the rights management policies that can be implemented and an enormous versioning problem (since there needs to be a separate version of encrypted content 102 for each consumer and a new version of the encrypted content whenever the rights change).

More sophisticated DRM systems deliver the rights separately from the content (from a DRM server 108). The rights are encoded in some electronic format 110 (i.e. electronic "rights") and specify the permitted relationship between consumers and DRM-encrypted content sets (and subsets), e.g. which content the consumer can access, what they are permitted to do with it (e.g. printing), and for how long.

A specialised viewer (the DRM client 106) resident on the consumer device is required to obtain, manage and interpret the rights, temporarily decrypt the encrypted content and view/play it within a secure environment (so that the consumer cannot obtain access to the raw decrypted content or the decryption keys) subject to the restrictions implied by the consumer's rights (e.g. view but do not print a document). The DRM server 108 is responsible for issuing rights to requesting DRM clients 106. Current DRM systems typically issue rights to authenticated consumers at the time of purchase (or grant) and the rights are transferred to permanent storage on the consumer device 106.

In general, "content sets" can be thought of as a related set of one or more digital content files, buffers or streams. In general, "rights" can be thought of as an electronic description (explicit or by implication) of the association between consumers (or consumer devices) and DRM-protected content sets. Rights can optionally specify means of identifying the consumer (or consumer device) to which the rights 'belong'; means of identifying the content sets and subsets to which the rights apply; encryption keys and checksums (cryptographic or otherwise); and the specific access rights granted to the consumers (and/or their consumer devices) over those content sets (e.g. whether or not the consumer can print a document, the duration of access, etc.). Rights can be encoded in any machine-readable form (e.g. parsable languages, specialised data structures, etc.) and are used internally by the DRM system to grant, deny or meter consumer access to encrypted content.

A problem raised by the proliferation of DRM-encrypted content is that the search engines that are typically used by Internet users to locate content on the Internet cannot pierce this encryption layer to build their indexes and therefore DRM-encrypted content will be difficult to locate. Search engines come in many varieties but the basic concept is simple: they are either directed to a site or follow links to a site and build complex indexes for the content that end users can subsequently use to locate content by specifying free text or more specialised searches. Search engines are used to index content from across the entire Internet (e.g. Lycos, Excite, etc.) or locally on a particular site (e.g. the Microsoft search engine that performs free text search across Microsoft's site and internal knowledge repositories).

FIG. 2 illustrates schematically how a typical search engine operates. A server computer 202 controls access to both DRM-encrypted content 204 and to normal unencrypted content 206. In either case (DRM-encrypted content 204 or unencrypted content 206), the server 202 provides the content (designated by reference numeral 212 in FIG. 2) via a network 208 (e.g. the Internet or an intranet) to a search engine 214. The search engine 214 is operating under the control of an indexer 216 (or "crawler") that sends requests 210 to the server 202. The search engine 214 parses the received content 212 and adds processed data to a searchable free text index 218. Because the search engine 214 is unable to parse the received content 212 that corresponds to DRM-encrypted content 204, the DRM-encrypted content 204 is not indexed.

According to a first aspect of the present invention, there is provided a search engine that parses content encrypted by a digital rights management (DRM) system to produce a searchable index of the DRM-encrypted content, the search engine comprising: a DRM module that communicates with a DRM system to obtain access rights in order to be able to decrypt DRM-encrypted content for purposes of indexing; and, an indexer that parses the decrypted content to produce a searchable index.

According to a second aspect of the present invention, there is provided a method of producing a searchable index using a search engine that parses content encrypted by a digital rights management (DRM) system to produce a searchable index of the DRM-encrypted content, the method comprising the steps of: a DRM module of the search engine communicating with a DRM system to obtain access rights in order to be able to decrypt DRM-encrypted content for purposes of indexing; and, an indexer of the search engine parsing the decrypted content to produce a searchable index.

According to a third aspect of the present invention, there is provided a digital rights management (DRM) system, the system comprising: a DRM server that maintains location information for DRM-encrypted content managed by the server; the DRM server being adapted to communicate location information to a DRM-enabled search engine configured to index the DRM-encrypted content, to provide for a unified, trusted search over the DRM-encrypted content managed by the DRM server.

According to a fourth aspect of the present invention, there is provided a method of providing for a unified, trusted search over digital rights management (DRM) encrypted content managed by a DRM server that maintains location information for DRM-encrypted content managed by the server, the method comprising the step of: the DRM server communicating location information to a DRM-enabled search engine configured to index the DRM-encrypted content thereby to provide for a unified, trusted search over the DRM-encrypted content managed by the DRM server.

According to a fifth aspect of the present invention, there is provided a digital rights management (DRM) system, the system comprising: a DRM server that maintains location information for DRM-encrypted content managed by the DRM server; the DRM server being adapted to issue a DRM-enabled search engine with the rights to index DRM-encrypted content managed by the DRM server and to direct a said DRM-enabled search engine to the location of the DRM-encrypted content by the DRM server.

According to a sixth aspect of the present invention, there is provided a method of enabling a search engine to index digital rights management (DRM) content managed by a DRM server that maintains location information for DRM-encrypted content managed by the server, the method comprising the steps of: the DRM server issuing the DRM-enabled search engine with the rights to index DRM-encrypted content managed by the DRM server and directing the DRAM-enabled search engine to the location of the DRM-encrypted content.

According to a seventh aspect of the present invention, there is provided a digital rights management (DRM) system, the system comprising: a DRM encryption toolkit arranged to produce an index of unencrypted content before encrypting the unencrypted content to produce DRM-encrypted content, and arranged to issue the index and location of the DRM-encrypted content to a search engine to enable a said search engine to merge the index and location of the DRM-encrypted content into a complete search engine index.

According to an eighth aspect of the present invention, there is provided a method of producing a searchable index of digital rights management (DRM) encrypted content, the method comprising the steps of: a DRM encryption toolkit producing an index of unencrypted content before encrypting the unencrypted content to produce DRM-encrypted content such that a search engine can merge the index and location of the DIM-encrypted content into a complete search engine index.

According to a ninth aspect of the present invention, there is provided a digital rights management (DRM) system including an indexing capability, the system comprising: a DRM encryption toolkit arranged to produce an index in an interoperable index format capable of being merged into a complete index of at least one search engine.

According to a tenth aspect of the present invention, there is provided a digital rights management (DRM) data structure comprising publicly accessible data, placed in with DRM-protected information but visible through a DRM encryption layer, that is descriptive of the contents of the DRM-protected information and that is to be indexed.

According to an eleventh aspect of the present invention, there is provided a storage medium having stored thereon/therein a data structure as described above.

According to a twelfth aspect of the present invention, there is provided a method of protecting information by digital rights management (DRM), the method comprising the steps of: protecting the information using DRM; and, placing publicly accessible data in with the DRM-protected information such that the publicly accessible data is visible through the DAM encryption layer, the publicly accessible data being descriptive of the contents of the DRM-protected information and being indexable by a search engine.

In accordance with a preferred embodiment of the present invention, DRM-encrypted content is "opened up" to "trusted search", without compromising copyright control, thus allowing end users to locate DRM-encrypted content alongside open unencrypted content. The indexer (or crawler) of a search engine is provided a DRAM module for communication with a DRM server so that the indexer can access even the DRM-encrypted content nominally as if it were a human end user of the content. The indexer may be issued with a DRM-recognised "identity" so as to distinguish itself from other end users and other DRM-enabled search engines. Thus, the search engine can programmatically access the content, subject to being able to obtain permission from the DRM system.

Embodiments of the present invention will now be described by way of example with reference to the accompanying drawings, in which:

FIG. 1 illustrates schematically an overview of conventional digital rights management (DRM) systems;

FIG. 2 illustrates schematically an overview of a conventional search engine;

FIG. 3 illustrates schematically the use of an example of a "DRM-enabled" search engine in accordance with an embodiment of the present invention;

FIG. 4 illustrates schematically an example of how a DRM-enabled search engine may interoperate with a DRM service bureau in accordance with an embodiment of the present invention;

FIG. 5 illustrates schematically an example of a DRM system in which indexing is done at the time of encryption in accordance with an embodiment of the present invention; and, FIG. 6 illustrates schematically an example of the use of an incremental search index exchange format in accordance with an embodiment of the present invention.

In accordance with the preferred embodiment of the present invention, DRM-encrypted content is "opened up" to "trusted search", without compromising copyright control, thus allowing end users to locate DRM-encrypted content alongside open unencrypted content.

FIG. 3 illustrates schematically an example of an embodiment of the present invention. Like the prior art FIG. 2 embodiment, a request 210 is made to access particular content available via a network 208 which may be or include the Internet, an intranet or other network. The indexer (or crawler) 216 of the search engine 214 has a DRM module 302 for communication with a DRM server 306 so that it can access the content nominally as if it were a human end user of the content. In some embodiments, the indexer 216 is issued with a DRM-recognised "identity" so as to distinguish itself from other end users and DRM-enabled search engines. Thus, the search engine 214 can programmatically access the content, subject to being able to obtain permission from the DRM solution. That is, where a human would use a secure DRM-controlled viewer to read or play encrypted content, the "crawler" 216 is provided with the secure DRM-controlled module 302 to be able to programmatically access and index encrypted content.

When the crawler 216 attempts to index the encrypted content within the content 212, the crawler 216 is granted or denied access to the encrypted content depending upon whether the content owner has indicated to the DRM server 306 to authorise the DRM module 302 to associate the crawler 216 with the rights to access and index that encrypted content. For most DRM solutions, this authorisation involves the crawler 216 requesting and receiving from the DRM server 306 a cryptographic key 304 for a given content file from the DRM solution, temporarily decrypting the file, and then performing its normal indexing procedure as if the file had never been encrypted. According to one embodiment, rights granted may be revoked. For example, a content owner may want to revoke access to a specific search engine.

FIG. 4 illustrates schematically how a DRM bureau may interoperate with DRM-enabled search engines. That is, some DRM solutions are operated in a bureau fashion, by which it is meant that a third party organisation provides a DRM-based service that publishers can use to securely is publish their content 401 to DRM-enabled consumers 106 without needing to support their own potentially expensive DRM infrastructure (e.g. rights-clearing servers, secure repositories, etc.). In most DRM architectures, this amounts to a network-accessible DRM server 306 that handles the "behind-the-scenes" rights management traffic (e.g. buying rights, storing rights, serving rights, etc.) that arises as consumers purchase and use DRM-encrypted content 212. A DRM encryption toolkit 402 is used to seal content within a layer of encryption and digital signatures. The DRM encryption toolkit 402 obtains the encryption keys from the DRM server 306 and seals metadata in with the encrypted content, for example identifying the item of content and its membership within defined content sets and categories and providing links to the DRM server 306 and web pages pertaining to the DRM-encrypted content. Some of this metadata is provided directly to the DRM encryption toolkit and some is obtained at the time of encryption from the DRM server 306.

Depending upon how the DRM bureau server operates, it may over time accumulate a large amount of information about where encrypted files are located. By way of example, the DRM encryption toolkit 402 communicates with the bureau DRM server 306 and can record where the resultant DRM-encrypted file is placed. The secure viewers executing within the client computers 106 generate logging information when the DRM-encrypted content is accessed which can include the location of the DRM-protected content. Using trusted search capabilities such as was described above with reference to FIG. 3, a DRM bureau server 306 can therefore provide a unified, trusted search over the set of DRM-encrypted content 212 managed by that DRM server 306. This may, for example, be by operating a DRM-enabled search engine 404, or directing a third-party DRM-enabled search engine 408 to the content files 212. This search capability is typically available to all consumers accessing encrypted content via that DRM bureau and provides a unified search across all the encrypted content from participating publishers.

The DRM encryption functionality 402 uses hardware or software components to actually encrypt the content files 401. The files are either encrypted by the publisher or on their behalf by a DRM service provider. Often, but not always, additional information is embedded alongside the content and within the encryption, e.g. information about the content, the publisher, where to go to obtain access rights, abstracts, watermarks, etc.

FIG. 5 illustrates schematically an example of a system in which indexing is done at the time of encryption. Namely, the DRM encryption toolkit 402 has access to the "raw" content 401 prior to encryption so the toolkit 402 can itself integrate the search engine's indexing technology and generate an index record 502 for the content file 401 as part of the encryption process. This index record 502, together with an indication of the location of the encrypted file, is provided to the search engine 504 to be merged into a complete index. This is a useful concept since the final part of the electronic publishing process could be viewed (see reference numeral 502) as (i) index, (ii) encrypt, (iii) publish to accessible location, and (iv) send index record plus location to be merged into full search engine index. This reduces the rather hit and miss approach of publishing content and then endeavouring to attract the attention of search engines to come and index recently published content.

The FIG. 5 embodiment can be generalised to both the case of a DRM bureau that either encrypts the publisher's content on their behalf or provides tools to allow the publisher to encrypt their own content to make use of the bureau's DRM solution. In both cases, the encryption tool can, as described above, index the content file prior to encryption and either transmit the index information (a) to third party search engines, or (b) to the bureau for consolidation prior to transmission on to third party search engines (dramatically increasing indexing throughput), or (c) to a "unified" bureau search engine as described above.

In another embodiment, the publishers can add publicly accessible data (e.g. abstracts) to DRM-protected content, either at the time the content is encrypted by the DRM encryption toolkit 402 or afterwards, that is outside the encryption wrapper and can be indexed by search engines that have not been DRM-enabled. This data would be chosen to be descriptive of the DRM-protected content so that, when indexed by a search engine, it will lead the search engine to the DRM-protected content it describes.

In yet another embodiment, the publicly accessible data is protected from tampering by digital signatures, so that if the data is modified the DRM-enabled search engines 404 and DRM clients 106 can detect this tampering and ignore the tampered data.

In yet another embodiment, the publicly accessible data added to the DRM-encrypted content is metadata or keywords chosen by the publisher to correspond to terms sent to search engines, similar to meta tags in HTML pages.

In yet another embodiment, the publicly accessible data added to the DRM-encrypted content is automatically generated using search indexing technology which automatically generates a sequence of keywords from the DRM-protected content that is indexable by other search engines but from which the original DRM-protected content cannot be reconstituted.

FIG. 6 illustrates schematically how multiple incremental indexes 602 resulting from the integration of search engine indexing technology into publishing components such as the DRM content encryption component are consolidated by a search engine merge function 604 into a "complete" index that is usable by the search engine to answer end user search requests. In one embodiment, the multiple search engines exchange and consolidate incremental search indexes in an interoperable electronic file format. The incremental search indexes have sufficient information to be efficiently merged into the complete index used for the actual search.

Embodiments of the present invention have been described with particular reference to the examples illustrated. However, it will be appreciated that variations and modifications may be made to the examples described within the scope of the present invention.

The invention claimed is:

1. A DRM-enabled search engine for locating digital rights management (DRM)-encrypted content available via a network, the DRM-enabled search engine comprising:
   a crawler that issues requests over a network to one or more servers to access DRM-encrypted content and receives, in return, DRM-encrypted content for purposes of indexing said content, the crawler having a DRM identity that can be recognized by a DRM system to distinguish itself from end users and other DRM-enabled search engines; and
   a DRM module that communicates the DRM identity of the crawler to the DRM system to conditionally obtain access rights comprising one or more decryption keys from the DRM system for the received DRM-encrypted content based on the DRM identity, the DRM module being adapted to use the access rights to temporarily decrypt said received DRM-encrypted content for purposes of indexing said content,
   wherein the crawler parses the received content previously decrypted by the DRM module to index said content, produces processed data based on said decrypted content, and adds said processed data to a searchable index,
   wherein a user of the DRM-enabled search engine is able to locate the indexed DRM-encrypted content on the network from outside of the DRM system by performing a search query on the searchable index, and
   wherein a content owner is able to revoke rights to access and index content from a specific DRM-enabled search engine using the DRM identity of the crawler.

2. A DRM-enabled search engine according to claim 1, wherein the access rights obtained by the DRM module are limited to those required for indexing the DRM-encrypted content.

3. A DRM-enabled search engine according to claim 1, wherein the DRM module is issued the access rights to index a subset of available DRM-encrypted content.

4. A DRM-enabled search engine according to claim 1, wherein the access rights are selectively granted and revoked.

5. A method of producing a searchable index for use in locating digital rights management (DRM)-encrypted content available via a network, the method comprising:
   a crawler of a DRM-enabled search engine issuing a request over a network to one or more servers to access DRM-encrypted content and receiving, in return, DRM-encrypted content for purposes of indexing said content, the crawler having a DRM identity that can be recognized by a DRM system to distinguish itself from end users and other DRM-enabled search engines;
   a DRM module of the search engine communicating the DRM identity of the crawler to the DRM system to conditionally obtain access rights comprising one or more decryption keys from the DRM system for the received DRM-encrypted content based on the DRM identity and temporarily decrypting said DRM-encrypted content for purposes of indexing said content;
   the crawler parsing the received content previously decrypted by the DRM module to index said decrypted content, producing processed data based on said content and adding said processed data to a searchable index; and
   enabling a user of the DRM-enabled search engine to locate the indexed DRM-encrypted content on the network from outside of the DRM system by performing a search query on the searchable index,
   wherein a content owner is able to revoke rights to access and index content from a specific DRM-enabled search engine using the DRM identity of the crawler.

6. A method according to claim 5, wherein the access rights issued to the DRM module are limited to those required for indexing the DRM-encrypted content.

7. A method according to claim 5, wherein the DRM module is issued the access rights to index a subset of available DRM-encrypted content.

8. A search engine according to claim 5, wherein the access rights are selectively granted and revoked.

9. A digital rights management (DRM) system, the system comprising:
   a DRM-enabled search engine according to claim 1,
   wherein the DRM system comprises a DRM server that maintains location information for DRM-encrypted content managed by the server, the DRM server being programmed to communicate location information to the DRM-enabled search engine in order to provide for a unified, trusted search over the DRM-encrypted content managed by the DRM server.

10. A system according to claim 9, wherein the DRM server is adapted to communicate the location information to said DRM-enabled search engine as the DRM server obtains the location information.

11. A system according to claim 9, further comprising means for granting said DRM-enabled search engine additional rights to enable the DRM-enabled search engine to decrypt and index additional DRM-encrypted content managed by the DRM server.

12. A method according to claim 5, the method further comprising the preliminary steps of:
   receiving a request at the DRM system for access to the DRM-encrypted content from the crawler;
   validating the DRM identity of the crawler; and
   communicating location information of the DRM-encrypted content to the DRM-enabled search engine.

13. A method according to claim 12, wherein the DRM system comprises a DRM server that communicates the location information to the DRM-enabled search engine as the DRM server obtains the location information.

14. A method according to claim 12, further comprising granting the DRM-enabled search engine additional rights to enable said DRM-enabled search engine to decrypt and index additional DRM-encrypted content managed by the DRM server.

15. A digital rights management (DRM) system, the system comprising:
   a DRM-enabled, search engine according to claim 1,
   wherein the DRM system comprises a DRM server that maintains location information for DRM-encrypted content managed by the DRM server, the DRM server being programmed to issue the DRM-enabled search engine with the rights to access and index DRM-encrypted content managed by the DRM server and to direct the DRM-enabled search engine to the location of the DRM-encrypted content by the DRM server.

16. A method according to claim 5, further comprising:
the DRM system issuing DRM-enabled the search engine with the rights to index DRM-encrypted content and directing the DRM-enabled search engine to the location of the DRM-encrypted content.

17. A DRM-enabled search engine according to claim 1, wherein the searchable index is a searchable free-text index for use in locating DRM-encrypted content using free-text searches.

18. A method according to claim 5, wherein the searchable index is a searchable free-text index for use in locating DRM-encrypted content using free-text searches.

19. A DRM-enabled search engine according to claim 1, wherein the crawler produces a searchable index of information contained within the DRM-encrypted content, the user of the search engine being able to locate the DRM-encrypted content on the network by referencing said information.

20. A method according to claim 5, wherein the parsing of the content produces a searchable index of information contained within the DRM-encrypted content, the user of the DRM-enabled search engine being able to locate the DRM-encrypted content on the network by referencing said information.

21. A search engine according to claim 1, wherein the crawler programmatically accesses the DRM-encrypted content to parse said content and produce a searchable index.

22. A method according to claim 5, wherein the step of parsing the content further comprises programmatically accessing said content.

\* \* \* \* \*